No. 877,311. PATENTED JAN. 21, 1908.
S. EVERSHED.
ELECTRIC SIGNALING APPARATUS.
APPLICATION FILED DEC. 23, 1905.
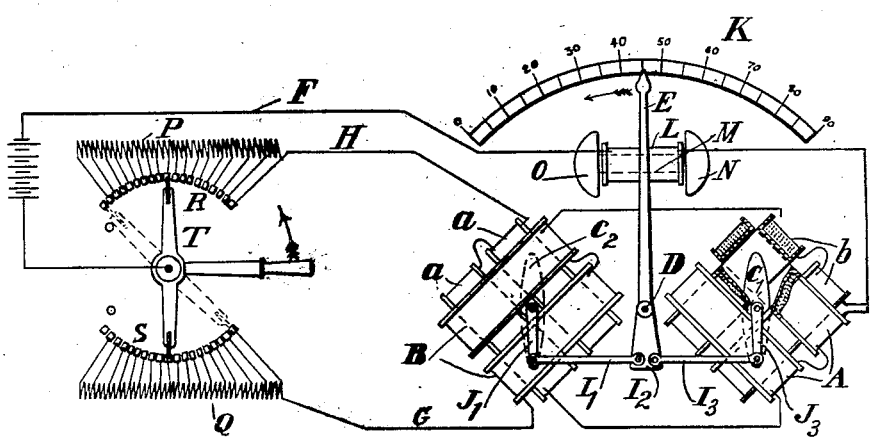
Fig 2
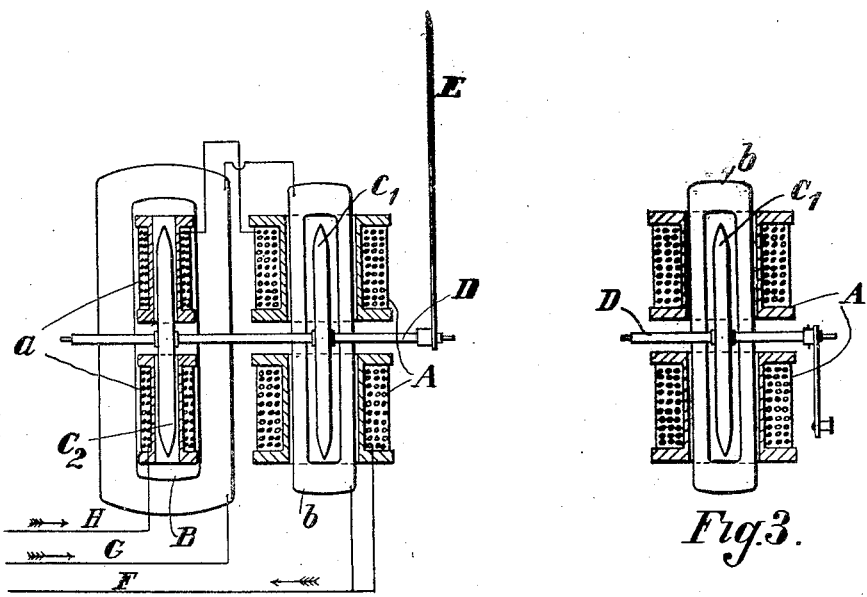
Fig 1
Fig 3.
WITNESSES
W. P. Burke
A miller
INVENTOR
Sydney Evershed
BY Richardson
ATTYS.

UNITED STATES PATENT OFFICE.

SYDNEY EVERSHED, OF LONDON, ENGLAND, ASSIGNOR TO HIMSELF AND EVERSHED AND VIGNOLES LIMITED, OF LONDON, ENGLAND, A CORPORATION.

ELECTRIC SIGNALING APPARATUS.

No. 877,311.  Specification of Letters Patent.  Patented Jan. 21, 1908.

Application filed December 23, 1905. Serial No. 293,121.

*To all whom it may concern:*

Be it known that I, SYDNEY EVERSHED, a subject of the King of Great Britain and Ireland, residing at London, England, have invented new and useful Improvements in Electric Signaling Apparatus, of which the following is a specification.

This invention relates to telegraphic apparatus intended for the transmission of a limited number of prearranged signals, orders, or signs, and is applicable to ships' telegraphs and communications, railway train-describing telegraphs, mining telegraphs, engine room telegraphs and the like. Our invention is based upon the ratio principle described in specification of British Patent No. 8784 of 1891 whereby the indication of the receiving apparatus is made to depend solely upon the ratio in which the transmitting apparatus divides the current flowing in two or more parallel circuits, and the objects of our present invention are to facilitate and extend the application of this principle by increasing the working forces and the angular range of the ratio indicator, and by reducing the consumption of electric energy in the apparatus and to reduce the stray magnetic fields of the indicator so that the apparatus may be used on board ship in close proximity to the ship's compass without producing any appreciable compass error.

In carrying out our invention we prefer to employ the simplest form of ratio indicator, namely that in which the two ratio coils are fixed in such relative positions as to have their magnetic axes in the same plane and at an angle, preferably a right angle, with each other. We use a freely pivoted soft iron or steel needle to indicate the ratio of the currents in the two coils by taking up a position of equilibrium in the direction of their resultant field. This form of indicator although extremely simple and not liable to get out of order, has not been extensively used owing to the excessive consumption of energy necessary to secure adequate working forces and angular range of movement of the needle.

According to our present invention the maximum possible working forces may be obtained by the combination of suitable ratio coils with a magnetic needle so proportioned as to have the maximum magnetic moment when subjected to the particular magnetizing force of the coils, and of the minimum moment of inertia about its axis of rotation. By making our needle either an ellipsoid of revolution, or a flat ellipsoid of equivalent proportions, we are able to predetermine its magnetic moment and so calculate the best possible proportion between the dimension of the needle and the strength of the resultant magnetic field of the ratio coils. The ratio of magnetic moment to inertia moment being a maximum in an ellipsoid needle, our improved needle and coils provide large working forces for a very moderate consumption of energy in the ratio coils and secure this result with a needle of minimum inertia and therefore maximum rapidity of movement.

To obtain the most favorable proportion as regards economy of material and consumption of energy in the ratio coils it is essential that they should closely surround the needle. This condition is generally secured by winding the coils on bobbins which are adapted to fit one inside the other, having a hole or slot through which the axle of the needle passes; the number of turns of wire wound on the inner coil must be less than those on the outer coil, so that when equal currents traverse them, their magnetic fields are approximately equal. The needle will then take up a middle position with its magnetic axis bisecting the angle subtended by the magnetic axes of the coils. Changes in the ratio of the two currents will then cause the needle to be deflected one way or the other according to whether the value of the ratio is increased or diminished; but equal changes of the ratio will not give equal deflections on both sides of the middle angle, because the configurations of the magnetic fields of the two coils differ very considerably in consequence of their necessarily different dimensions.

A symmetrical scale on both sides of the middle point may be obtained by the use of a transmitter adapted to change the current ratio by the required unequal increments but we prefer to use symmetrical transmitting apparatus and to secure a symmetrical scale in our indicator by duplicating the needle and ratio coils and electrically connecting the latter so that an inside and outside coil are in series in each ratio circuit. In this way the want of symmetry of one pair of coils is exactly counterbalanced by the equal but opposite want of symmetry of the other pair and hence the scale of our duplex indicator is symmetrical about the central point.

The two pairs of ratio coils in our duplex indicator may either be fixed in such relative positions as will enable the two needles to be attached to a common axle, or we may attach the needles to separate axles which can be mechanically connected by connecting rods or other suitable gearing. When the indicator is to be used in close proximity to a ship's compass we so connect the two pairs of coils that their external or stray magnetic fields, and also those of the two needles, may as far as possible neutralize each other. But although such an arrangement of coils and needles forms what is called an astatic combination it is not possible to entirely eliminate stray fields by means of duplex coils. We therefore provide a compensating magnet formed by winding a coil round an iron core of suitable dimensions, and so fixed with regard to the duplex indicator coils as to neutralize their effective magnetic moment throughout the space external to the ratio coils. We connect the exciting coil or coils of our compensating magnet in series with the indicator circuit so that accuracy of compensation may not be disturbed by variations in the current strength.

We may use any known means for varying the ratio in which the total current is divided in the two ratio circuits but in order to provide the very large range of different ratio values necessary to give our indicator needles a total angular range of 90 degrees, we prefer to use a form of transmitter described in British Specification No. 12279 of 1899 and composed of two independent series of resistance coils, one in each ratio circuit, connected to two multiple point switches. The switches are mechanically connected and when the double switch is moved over the double series of contacts the resistance coils of one of the series are successively cut out of one ratio circuit, while the resistance coils of the other series are successively added to the other ratio circuit. The two series of resistances being quite independent, it is possible to change the current ratio to any desired extent while keeping the sum of the ratio currents, that is to say the total current, constant. Or again, if it is desired to keep the resultant field of the ratio coils constant throughout the whole range of ratio values, the resistances in the transmitter may be calculated to fulfil this condition. But since the first condition requires the sum of the ratio currents to be constant while the second necessitates keeping the sum of the squares of the currents constant, it is obviously impossible to fulfil both conditions at once.

Suitable means are provided in our indicator for showing the required signals, orders or numbers either by an index ranging over a dial or other known methods of indication. And in order that our invention may be the better understood, we now proceed to describe the same, reference being had to the drawings hereto annexed and to the letters and figures marked thereon.

Figure 1 is a sectional elevation of our indicator with superposed duplicated ratio coils and two ellipsoid needles upon one axle. Fig. 2 is an elevation and part section of our indicator with duplicated ratio coils fixed side by side, connected to a transmitter adapted to provide the maximum possible variation in the ratio of the two currents, and fitted with a compensating magnet to eliminate the effect of the external fields of the ratio coils. Fig. 3 is a sectional elevation of one of the elements of Fig. 2.

In the drawings like letters refer to like parts.

In Fig. 1, the outer and inner ratio coils A, $b$ of one element are connected respectively to the inner and outer ratio coils $a$ B of the other elements so that the current flowing in one ratio wire G traverses the coils B and $b$ in series, and the current in the wire H traverses the coils $a$ and A in series. In this way the want of symmetry in the configuration of the magnetic fields of the outer and inner coils of one element is exactly neutralized by the corresponding but opposite want of symmetry of the fields of the other element and the indicator has a scale which is symmetrical on each side of the middle point.

The ratio coils closely surround two magnetic needles $C_1$ and $C_2$ which are fixed upon an axle D carrying a pointer E or other suitable indicating device. The needles are either ellipsoids of revolution or flat ellipsoids of equivalent proportions, and we prefer to make them of iron having the highest attainable permeability. By means of the previously determined relation between magnetic force and magnetic induction for the particular sample of iron used in making the needles, we are able to apply the known laws of magnetic ellipsoids and obtain the best proportion between the major and minor axes of the needles. In all cases we make the needles as long as is consistent with free rotation inside the coils. When the inertia of the axle and parts attached thereto is large compared with the inertia of the needles, we use needles of the largest diameter adapted to rotate freely within the ratio coils. The magnetic moment of the needles will then be a maximum for a particular value of the magnetic fields of the coils. On the other hand if the inertia of the needles exceeds that of the remainder of the moving system we reduce the minor axis of the needles until the ratio of their magnetic moment to the inertia of the whole system is a maximum.

To obtain adequate working forces for a moderate waste of energy in the ratio coils, it is essential that the coils should very closely surround the needles. Accordingly we wind our coils on bobbins made of thin sheet metal covered with thin insulation of paper or other suitable material. For the same reason we use copper wire having the thinnest possible covering of silk, so that the space occupied by insulating material may be a minimum. We prefer to use highly conductive copper sheet for our bobbins so that they may have an appreciable damping action upon the oscillations of the needles.

To prevent stray magnetic fields of the coils and needles from affecting neighboring instruments, and particularly to avoid compass errors on board ship, we connect the two elements of our indicator so that the two needles $C_1$ and $C_2$ have the two opposite poles of the same polarity. Hence the needles form an astatic system which has no magnetic effect at any distance comparable with about ten times the distance between the two needles. The ratio coils however, although they also are necessarily of opposite polarity, do not form an astatic system owing to the largely different areas of the outer and inner coils. In practice we find the outer coils have an appreciable external field even at considerable distances and when our indicator is to be used near a compass we compensate for this stray field by means hereinafter described.

The superposing of the two elements of our indicator involves the use of a long axle and the arrangement occupies a considerable depth in the axial direction. When the space available precludes the use of an indicator with superposed elements we place them side by side and connect the two needle axles by toothed gearing or other equivalent means.

In Fig. 2 we show an indicator in which the two elements are mechanically connected with the indicating axle D by means of cranks $I_1$ $I_2$ $I_3$ and connecting rods $J_1$ and $J_3$; the indicating device consists of a pointer E ranging over a scale K. This arrangement is well adapted for our purpose since it provides a very simple means of connection and at the same time the cranks and connecting rods serve to balance the weight of the pointer. In Fig. 2 the axles are supposed to be horizontal and the pointer vertical. In this position the stray or external magnetic fields of the two outer coils A and B have quite appreciable horizontal components which may cause errors on a neighboring compass. To avoid this we neutralize these components of external fields by means of an electro-magnet having a core M with large polar surfaces N and O. The magnet is excited by means of a coil L placed in the common-return wire F which carries the sum of the ratio currents and said magnet is situated above the indicator coils with its poles at an equal distance from either of the latter. We generally prefer to work our indicators by means of a constant total current and in that case the sum of the separate stray fields of the coils A and B remains constant throughout the whole range of values which may be given to the ratio of the currents in H and G; hence a magnet excited by the sum of the currents will, when properly adjusted, neutralize the horizontal stray fields and the compensation will not be affected by variations in current strength provided the core M is not near the saturation limit. We describe our compensating magnet in its application to our duplicated ratio coils, but it may also be usefully applied to any ratio coil indicator when it is desired to avoid compass errors.

In Fig. 2 we show our duplicated indicator connected to a transmitter of the type in which the greatest possible variation in current ratios can be obtained and either the sum of the currents or the sum of the squares of the currents are kept constant. P and Q are the two independent subdivided resistances connected to the switch contacts R and S. A double ended switch arm T ranges over the two series of contacts and changes the current ratio from an infinite positive value to an infinite negative value by any required number of steps. When the switch handle is moved in the direction of the arrow the current in wire G is increased, while that in wire H is diminished. Hence the fields of the coils B and $b$ are increased, while the fields of the coils A and $a$ are diminished. The effect of this change in relative field strengths is to deflect the pointer E in the direction of the arrow. In the limit the switch arm T reaches the position indicated by dotted lines breaking the circuit H and causing the whole current to flow in wire G. The coils A $a$ will now have no field and hence the needles will lie along the magnetic axes of the coils B $b$. The pointer will therefore have moved over an arc of 45° and will stand at zero on the scale K.

Having now described our invention, what we claim and desire to secure by Letters Patent is:—

1. In combination, a resistance transmitter, two combined current ratio indicators, one circuit from the transmitter passing in series round the two coils which are both relatively to the needles in the same plane, the other circuit from the transmitter passing in series round the other two coils which are at right angles to the two former ones as regards the two needles, the said two needles being made as ellipsoids of revolution, and the said coils being brought as close as possible to the said needles.

2. In combination, a resistance transmitter, two combined current ratio indicators with two coils of the indicator connected in series to one transmitter circuit, the other passing round the other two coils of the indicators, the two needles being made as ellipsoids of revolution and a magnet the coil of which is in the common return wire of the two indicator circuits the said magnet being situated above the said indicators, and under the pointer, having a pole at either end the distance from each pole to the nearest indicator coil being the same.

3. In combination, a transmitter, a current ratio indicator, two double coils each double coil having its separate or component coils at an angle of 90° to one another, two ellipsoid needles one of which is snugly inclosed in each of the said double coils, an arm fixed to each of the said needles, a crank fixed at the end of each arm, connecting links pivoted on the said cranks, and connected to the rear end of a pivoted indicating pointer.

In testimony whereof I have signed my name to this specification in the presence of two subscribing witnesses.

SYDNEY EVERSHED.

Witnesses:
   JOHN C. FELL,
   CHARLES CARTER.